(12) United States Patent
Kemper

(10) Patent No.: US 8,825,000 B2
(45) Date of Patent: Sep. 2, 2014

(54) SYSTEMS AND METHODS FOR SAFELY OPERATING A MOBILE COMMUNICATION DEVICE

(71) Applicant: Dennis Randolph Kemper, Eindhoven (NL)

(72) Inventor: Dennis Randolph Kemper, Eindhoven (NL)

(73) Assignee: Bao Tran, Saratoga, CA (US)

( * ) Notice: Subject to any disclaimer, the term of this patent is extended or adjusted under 35 U.S.C. 154(b) by 0 days.

(21) Appl. No.: 13/707,694

(22) Filed: Dec. 7, 2012

(65) Prior Publication Data

US 2014/0162588 A1     Jun. 12, 2014

(51) Int. Cl.
*H04W 4/02*     (2009.01)

(52) U.S. Cl.
CPC .................................... *H04W 4/027* (2013.01)
USPC ..................... 455/404.2; 455/456.4; 455/63.2

(58) Field of Classification Search
CPC ................................ H04Q 7/20; H04M 11/10
USPC ....................... 455/404.1, 404.2, 456.1, 456.4
See application file for complete search history.

(56) References Cited

U.S. PATENT DOCUMENTS

| | | | |
|---|---|---|---|
| 6,690,940 B1 * | 2/2004 | Brown et al. | 455/456.4 |
| 2010/0035556 A1 * | 2/2010 | Cai et al. | 455/63.2 |

* cited by examiner

*Primary Examiner* — Kashif Siddiqui
(74) *Attorney, Agent, or Firm* — Tran & Associates

(57) ABSTRACT

Systems and methods control operation of a mobile communication device in a vehicle by determining if the vehicle is moving; if the vehicle is stationary, allowing calls to reach a cell tower; if the vehicle is moving and the mobile communication device is used, disabling a transmission from the mobile communication device to the cell tower; and if the vehicle is moving and an emergency phone sequence is dialed, allowing the transmission from the mobile communication device to the cell tower.

14 Claims, 4 Drawing Sheets

| |
|---|
| Re-router determines if car is moving using accelerometer (402) |
| If car is stationary, allow calls to reach cell tower (404) |
| If car is moving and if user attempts to call out, disable call to cell tower (406) |
| If car is moving and an emergency phone sequence is dialed, allow call to cell tower (408) |

FIG. 4

SYSTEMS AND METHODS FOR SAFELY OPERATING A MOBILE COMMUNICATION DEVICE

BACKGROUND OF THE INVENTION

The invention is related to operations of a cellular phone in a vehicle.

Due to the wide spread use of cellular phones, they have become very important electronic products to the human life. However, due to the potential for users to become distracted while using the phones, advocates for cell phone safety dominate the swirling safety controversy. Most safety specialists argue that the cell phone safety issue is a multi-pronged problem. Cell phones pose a risk in two basic ways: 1) cell phones introduce conversation into the driving equation; and 2) use of a cell phone is a distraction, not unlike changing the radio station. Human behavior then may be construed to be the number one danger, an attachment to cell phone use.

As noted in U.S. Pat. No. 7,505,730, a cellular phone jammer, claiming to effectively obstruct cellular phone signals within a specific range so as to disable the cellular phone's communication function, is available on the market. U.S. Pat. No. 6,301,475 granted to Saarela, et al. for a "Procedure for limiting the mobility area of a terminal device in a wireless local loop" defines a mobility area (MOA) to perform inhibiting communications in accordance with geographical locations. However, in critical conditions such as a fire accident in a theater, it would cause a tragedy if the cellular phone cannot be used for emergency calls. This is the main reason why the cellular phone jammer is not legal yet in many countries. Therefore, it is desirable to provide a cellular phone jammer to be used ordinarily to effectively inhibit the communication function of the cellular phones, yet to be automatically turned off to allow the communication when there is an emergency within the area.

U.S. Pat. No. 7,505,730 discloses a cellular phone jammer permitting cellular phones to be used in an emergency, and includes a cellular phone signal-obstructing apparatus and an alarm apparatus. The cellular phone signal-obstructing apparatus further has a cellular phone signal-blocking unit, a power supply unit, and a trigger unit. The cellular phone signal-blocking unit sends out a blocking-signal to disconnect the communication between cellular phones and cellular tower within the effective range. The trigger unit connects to the power supply unit and cellular phone signal-blocking unit in series. The invention effectively disconnect the communication between the cellular phones and cellular tower within a range, yet automatically turns off the jammer when there is an emergency in the designated area to resume normal communication between cellular phones and cellular tower so that the users can call for help.

SUMMARY

In one aspect, systems and methods are disclosed to control operation of a mobile communication device in a vehicle by determining if the vehicle is moving; if the vehicle is stationary, allowing calls to reach a cell tower; if the vehicle is moving and the mobile communication device is used, disabling a transmission from the mobile communication device to the cell tower; and if the vehicle is moving and an emergency phone sequence is dialed, allowing the transmission from the mobile communication device to the cell tower.

In another aspect, a system and method controls the operation of mobile devices operating in a vehicle. The system works with a communication network that includes a macrocell base station and a number of femtocells, each femtocell including a base station. The method receives initialization data on a backhaul connection that connects the femtocell base station and the macrocell base station, and configures the femtocell base station transmitting power based on the initialization data. The method receives a user equipment identifier from a macrocell user equipment in the communication network, and validates the user equipment identifier to determine whether the operation of the cell phone is authorized or unauthorized. When the operation of the phone is authorized, the method grants the macrocell user equipment access to the femtocell base station. When the operation of the cell phone is unauthorized, the method receives user equipment information that describes the macrocell user equipment on the backhaul connection, and adjusts the femtocell base station transmitting power based on the user equipment information to allow or disallow usage of mobile devices in the communications network.

Advantages of the system may include one or more of the following. The system blocks phone usage while driving. The system blocks the use of cell phone use in cars which impairs driving, causes accidents. The act of physically holding a handset removes one hand from the controls, making accidents more likely, while dialing is even worse, as it also requires the user to divert their attention away from the road. Research shows that drivers speaking on a mobile phone have much slower reactions in braking tests than non-users, and are worse even than if they have been drinking. Even more dangerous than talking on the phone while driving is fumbling in a pocket or handbag for a ringing phone while travelling at high speed on the motorway. The system takes away the risk of misjudging cell phone usage dangers. Those who assert they know the difference between safe and unsafe use of phones should ask themselves if they are equally confident that the testosterone-loaded 18-year-old rushing from football practice to meet his girlfriend will show the same good judgment when his phone beeps as he approaches in the opposite direction.

BRIEF DESCRIPTION OF THE DRAWINGS

FIG. 4 shows an exemplary call control system for mobile communication devices in a vehicle in accordance with the present invention.

DESCRIPTION

Figure 1:
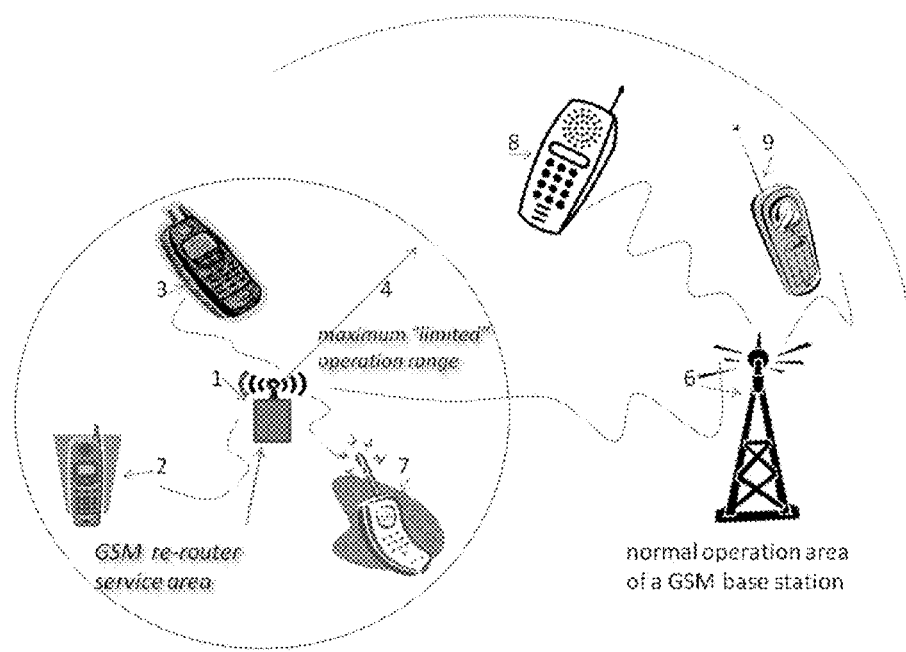
FIG. 1 shows an exemplary cell phone jamming system for vehicles.

FIG. 1 shows an exemplary cell phone control system for vehicles. In one embodiment, a cell phone re-router 1 is provided inside of a vehicle. The re-router 1 communicates with one or more phones 2, 3 and 7. The re-router 1 has a predetermined limited range of operation 4 that affects only phones 2, 3 and 7 within the predetermined range 4 and does not affect cell phones 8-9. The re-router 1 in turn communicates with a cell tower base station (BS) 6 operated by a network provider. The tower 6 can be a GSM base station, for example.

Each network provider works with cellular telephone sets containing unique SIM card numbers for its own network and for which a subscription is in effect or a prepaid card is purchased. The re-router 1 allows normal telephone traffic in a certain limited area to be controlled in accordance with regulatory requirements or safety requirements.

The re-router 1 acts as a "GSM Jammer" which cell phone operations while driving are banned by the governmental organizations for safety reasons. These devices generate a broadband radio signal broadcast in the frequency bands of mobile phones, where the original radio signals from regular phone base stations are suppressed. All radio signals, not only of mobile phones which are disturbed are by the regulator in Europe and other countries is not accepted.

The transmission of these signals to be recognized by the mobile phones as a strong high-frequency electromagnetic field that contains a radio signal recognized by the mobile phone in the immediate vicinity of the device. In one embodiment, the stronger electromagnetic field will be recognized by the phone as a signal from a regular telephone provider base station 6 and the broadcast data information considered by the phone as information from the provider where the phone user has a subscription or a prepaid card purchased. This will cause the phone to connect with the re-router 1 and breaks the connection to the original network transmitted by tower 6. Incoming calls will be disabled because the phone is not connected to the network provider anymore and the target cell phone device 2, 3, and 7 will not connect with the tower 6.

In this embodiment, software in the re-router 1 analyzes calls from the regular telephone network, and the software allows predetermined telephone numbers to be passed through to the cellular telephone 2, 3, and 7. Outgoing calls will normally be only emergency numbers which can be chosen and which allows the cell phone device to establish a voice connection to the emergency call center. Provisions will be included so that pre-programmed telephone numbers can be stored to allow use these pre-programmed telephone numbers to established a voice connection.

In exceptional cases, telephone calls must be possible and this device has the ability to re-route a phone connection in these cases and the call has been passed to the mobile phone that the call has been initiated. A mobile phone is required by government rules, to include the opportunity in all circumstances in case of an emergency situation to do so, even in cases where the mobile phone does not have a subscription or prepaid card.

The system regulates mobile telephone traffic in an area where the facility (1) is installed. The device (1) sends out a signal in which mobile phones (2, 3, 4 and 7) their connection to the normal base station (6) losses, and this connection is hereby taken over by the invented device (1). The device is equipped with all the necessary hardware and software to send the data information as required by the network provider broadcast towers base stations that operate the regular telephone traffic (8, 9).

Figure 2:
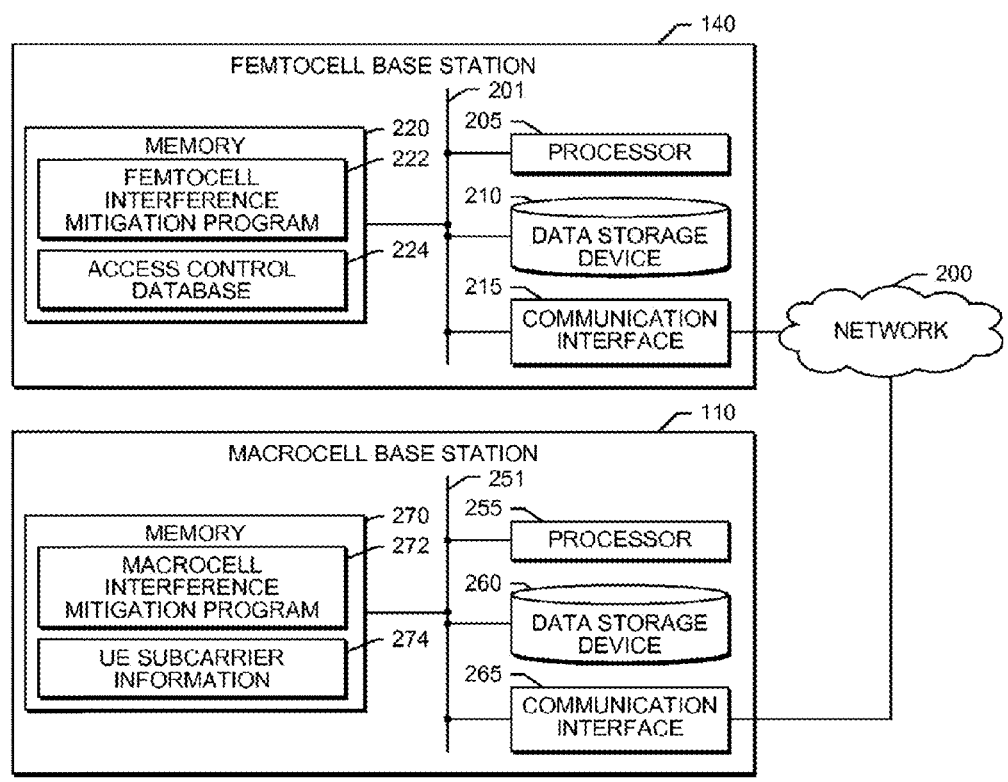
FIG. 2 is a block diagram that illustrates, in detail, one embodiment of the hardware components shown in FIG. 1.

In one embodiment, the re-router 1 is a femtocell BS such as those disclosed in United States Patent Application 20100035556. In particular, FIG. 2 illustrates the hardware components and software comprising a femtocell BS 140 and a macrocell BS 110. The macrocell base station (BS) 110 controls communications in a macrocell 100 coverage range. In one embodiment, the macrocell 100 coverage range is a residential or business area which is transmitted using tower 6 of FIG. 1. In another embodiment, the coverage range for the macrocell 100 includes a number of residential or business areas. A macrocell user equipment (UE) 120, such as a mobile telephone or other mobile communication device, communicates voice and data via the macrocell BS 110 with another macrocell UE (not shown) either in the macrocell 100 coverage range or in another macrocell (not shown) coverage range.

The femtocell BS 140 shown in FIG. 2 is a general-purpose computing device that performs the communication restrictions in accordance with the present invention. A bus 201 is a communication medium that connects a processor 205, data storage device 210 (such as a disk drive, flash drive, flash memory, or the like), communication interface 215, and memory 220. The communication interface 215 transmits and receives the data between the femtocell BS 140 and the macrocell BS 110 via the network 200. The processor 205 performs the disclosed methods by executing the sequences of operational instructions that comprise each computer program resident in, or operative on, the memory 220. The reader should understand that the memory 220 may include operating system, administrative, and database programs that support the programs disclosed in this application. In one embodiment, the configuration of the memory 220 of the femtocell BS 140 includes a femtocell interference mitigation program 222 and an access control database 224. The femtocell interference mitigation program 222 and access control database 224 perform the method of the present invention disclosed in detail in FIG. 3. When the processor 205 performs the disclosed methods, it stores intermediate results in the memory 220 or data storage device 210. In another embodiment, the memory 220 may swap these programs, or portions thereof, in and out of the memory 220 as needed, and thus may include fewer than all of these programs at any one time.

The macrocell BS 110 shown in FIG. 2 is a general-purpose computing device that performs the present invention. A bus 251 is a communication medium that connects a processor 255, data storage device 260 (such as a disk drive, flash drive, flash memory, or the like), communication interface 265, and memory 270. The communication interface 265 transmits and receives the data between the macrocell BS 110 and the femtocell BS 140 via the network 200.

The processor 255 performs the disclosed methods by executing the sequences of operational instructions that comprise each computer program resident in, or operative on, the memory 270. The reader should understand that the memory 270 may include operating system, administrative, and database programs that support the programs disclosed in this application. In one embodiment, the configuration of the memory 270 of the macrocell BS 110 includes a macrocell interference mitigation program 272 and UE subcarrier information 274. The macrocell interference mitigation program 272 and UE subcarrier information 274 perform the method of the present invention disclosed in detail in FIG. 3. When the processor 255 performs the disclosed methods, it stores intermediate results in the memory 270 or data storage device 260. In another embodiment, the memory 270 may swap these programs, or portions thereof, in and out of the memory 270 as needed, and thus may include fewer than all of these programs at any one time.

The network 200 shown in FIG. 2, in an exemplary embodiment, is a public communication network that connects the femtocell BS 140 and the macrocell BS 110. The present invention also contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA), Code Division Multiple Access (CDMA), or Orthogonal Frequency Division Multiplexing (OFDM) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

Figure 3:
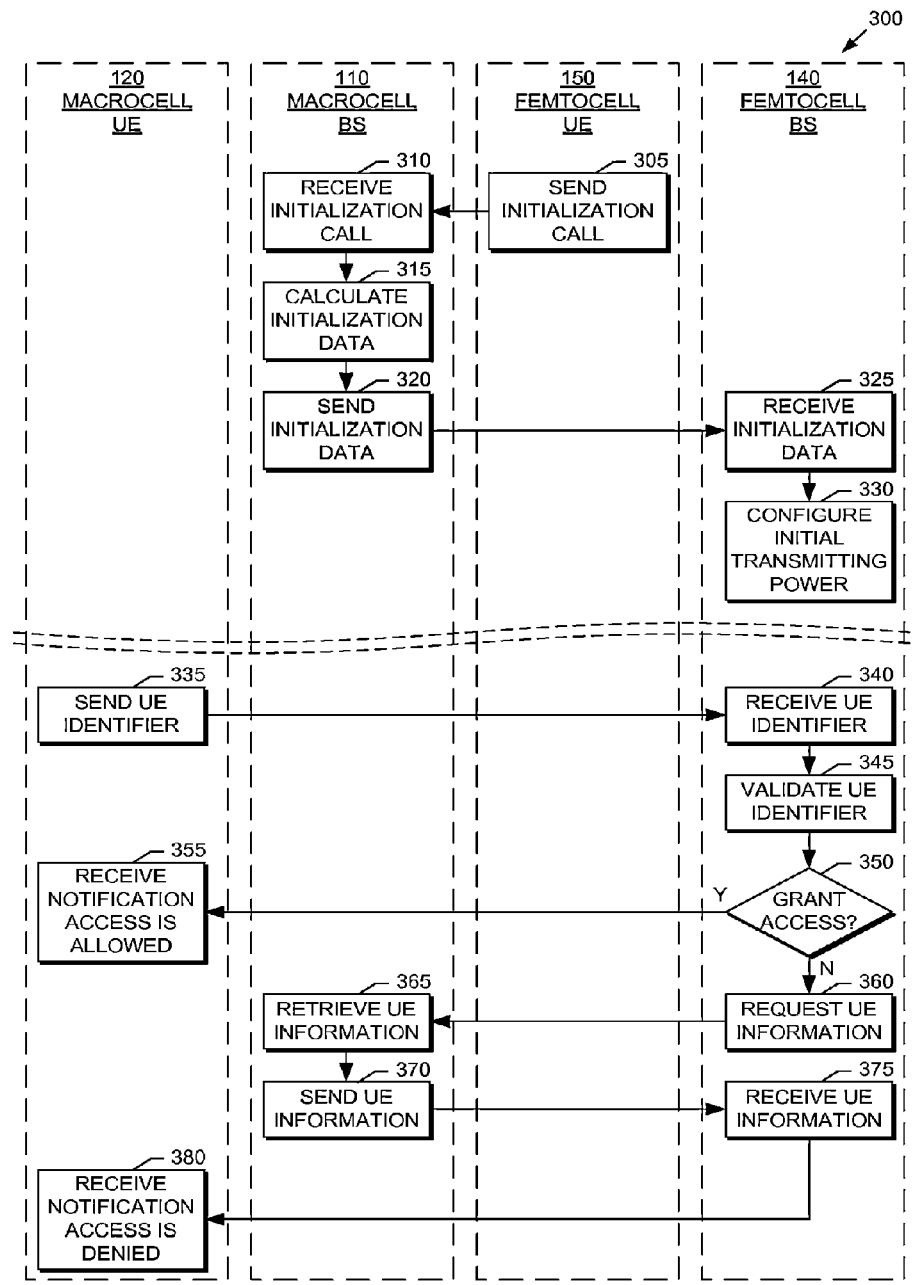
FIG. 3 is a flow chart that illustrates one embodiment of a method for initializing and operating the re-router of FIG. 1 in a communication network for the present invention.

FIG. 3 is a flow chart that illustrates one embodiment of a method for managing interference in a communication network for the present invention. With reference to FIG. 1 and FIG. 2, the process 300 shown in FIG. 3 begins when the femtocell UE 150 sends an initialization call to the macrocell BS 110 (step 305). After receiving the initialization call (step 310), the macrocell BS 110 uses the initialization call communication messages to calculate initialization data for the femtocell BS 140 (step 315). In one embodiment, the initialization data include an approximation of the path loss and interference level at the femtocell UE 150. The macrocell BS 110 sends the initialization data to the femtocell BS 140 (step 320) on the backhaul connection between the femtocell BS 140 to the macrocell BS 110. After the femtocell BS 140 receives the initialization data (step 325), it uses the initialization data to configure the initial transmitting power for the femtocell BS 140 (step 330).

The process 300 shown in FIG. 3 then continues, when the macrocell UE 120 approaches the femtocell 130. The macrocell UE 120 sends its UE identifier (ID) to the femtocell BS 140 (step 335). The femtocell BS 140 receives the UE ID (step 340) and validates the UE ID (step 345). In one embodiment, the UE ID is the International Mobile Subscriber Identify (IMSI) for the macrocell UE 120. The femtocell BS 140 uses the UE ID to determine whether to grant the macrocell UE 120 access to the femtocell BS 140 (step 350). In one embodiment, the femtocell BS 140 maintains an access control list or database of authorized UEs that it uses to validate that the UE ID is permitted to access the femtocell BS 140. When the femtocell BS 140 recognizes the UE ID for the macrocell UE 120 as an authorized UE (step 350, Y branch), there is no potential for interference between the femtocell BS 140 and the macrocell UE 120. The macrocell UE 120 receives a notification from the femtocell BS 140 that the macrocell UE 120 is allowed to access the femtocell BS 140 (step 355). When the femtocell BS 140 does not recognize the UE ID for the macrocell UE 120 as an authorized UE (step 350, N branch), there potentially may be interference between the femtocell BS 140 to the macrocell UE 120. The femtocell BS 140 uses the backhaul connection to the macrocell BS 110 to request additional UE information that describes the macrocell UE 120 (step 360). The macrocell BS 110 retrieves the additional UE information for the macrocell UE 120 (step 365) and sends the additional UE information via the backhaul connection to the femtocell BS 140 (step 370). After the femtocell BS 140 receives the additional UE information (step 375), the macrocell UE 120 receives a notification from the femtocell BS 140 that the macrocell UE 120 is not allowed to access the femtocell BS 140 (step 380).

FIG. 4 provides more details on the granting of access to the network discussed in step 355 of FIG. 3. In this embodiment, the re-router 1 (FIG. 1) or the femtocell BS 140 (FIG. 2) determines if the vehicle is moving using suitable sensors such as accelerometers (402). If the vehicle or car is stationary, step 355 allows calls to reach the cell tower (404). Alternatively, if the car is moving and if the user attempts to call out, the software in step 355 disables the call to the cell tower (406). Additionally, if the car is moving and an emergency phone sequence is dialed, the system allows the call to be made to the cell tower BS or macrocell BS (408).

The system blocks phone usage while driving. The system blocks the use of cell phone use in cars which impairs driving, causes accidents. The act of physically holding a handset removes one hand from the controls, making accidents more likely, while dialing is even worse, as it also requires the user to divert their attention away from the road. Research shows that drivers speaking on a mobile phone have much slower reactions in braking tests than non-users, and are worse even than if they have been drinking. Even more dangerous than talking on the phone while driving is fumbling in a pocket or handbag for a ringing phone while travelling at high speed on the motorway. The system takes away the risk of misjudging cell phone usage dangers. Those who assert they know the difference between safe and unsafe use of phones should ask themselves if they are equally confident that the testosterone-loaded 18-year-old rushing from football practice to meet his girlfriend will show the same good judgment when his phone beeps as he approaches in the opposite direction.

The various embodiments of the invention described herein can be deployed in a variety of systems, including, by way of example and not limitation, CDMA2000, UMTS and/or LTE (Long Term Evolution) systems, and using any of a variety of channel access methods, for example, Wideband Code Division Multiple Access (WCDMA) and Orthogonal Frequency-Division Multiple Access (OFDMA).

Although the disclosed embodiments describe a fully functioning method for minimizing interference for mobile devices operating in a communication network, the reader should understand that other equivalent embodiments exist. Since numerous modifications and variations will occur to those reviewing this disclosure, the method for minimizing interference for mobile devices operating in a communication network is not limited to the exact construction and operation illustrated and disclosed. Accordingly, this disclosure intends all suitable modifications and equivalents to fall within the scope of the claims.

What is claimed is:

1. A method to control operation of a mobile communication device in a vehicle, comprising:
   determining if the vehicle is moving;
   if the vehicle is stationary, allowing calls to reach a cell tower by configuring a femtocell base station with a predetermined range to inside the vehicle based on initialization data, wherein the femtocell base station intercepts and forwards the calls to the cell tower;
   if the vehicle is moving and the mobile communication device is used, disabling a transmission from the mobile communication device to the cell tower wherein the femtocell base station intercepts and blocks the calls to the cell tower; and
   if the vehicle is moving and an emergency phone sequence is dialed, allowing the transmission from the mobile communication device to the cell tower wherein the femtocell base station intercepts and forwards the calls to the cell tower.

2. The method of claim 1, comprising determining movement using an accelerometer.

3. The method of claim 1, wherein the emergency phone sequence comprises 911.

4. The method of claim 1, wherein the receiving of the initialization data further comprises: sending an initialization call to a macrocell base station at the cell tower, wherein mobile communication device sends the initialization call, and wherein the initialization data is calculated from based on transmission characteristics of the initialization call.

5. The method of claim 1, comprising validating the mobile communication device.

6. The method of claim 1, comprising identifying the mobile communication device with an International Mobile Subscriber Identify (IMSI).

7. The method of claim 6, wherein the IMSI identifying further comprises: comparing a user equipment identifier to an access control list, wherein when the access control list includes an entry that matches the user equipment identifier, and authorizing the mobile communication device.

8. The method of claim 1, comprising re-routing calls to and from the mobile communications device.

9. The method of claim 8, wherein re-routing uses a femtocell.

10. The method of claim 9, wherein the femtocell is based on Orthogonal Frequency-Division Multiple Access technology, comprising adjusting of the femtocell base station transmitting power to control.

11. The method of claim 10, comprising receiving subcarrier assignments for a macrocell equipment; and decreasing the femtocell base station transmitting power for the subcarrier assignments for the macrocell equipment.

12. A communication system, comprising:
a communication network including a macrocell base station and a femtocell located in a vehicle, the femtocell including a base station;
computer readable code to configure the femtocell base station transmitting power to limit range to inside the vehicle based on initialization data;
code to receive a user equipment identifier from a macrocell equipment in the communication network;
code to validate the user equipment identifier to determine whether the operation of the cell phone is authorized or unauthorized depending on vehicular movement.

13. The system of claim 12, when the operation of the phone is authorized, the macrocell equipment is granted access to the femtocell base station.

14. The system of claim 12, when the operation of the cell phone is unauthorized, the femtocell base station transmitting power is reduced based on the user equipment information to allow or disallow usage of mobile devices in the communications network.

* * * * *